United States Patent
Arita

(10) Patent No.: US 7,053,760 B2
(45) Date of Patent: May 30, 2006

(54) APPARATUS AND METHOD FOR ALARMING DECREASE IN TIRE AIR-PRESSURE

(75) Inventor: Masakazu Arita, Kobe (JP)

(73) Assignees: Sumitomo Rubber Industries, Ltd., Kobe (JP); Sumitomo Electric Industries, Ltd., Osaka-fu (JP)

(*) Notice: Subject to any disclaimer, the term of this patent is extended or adjusted under 35 U.S.C. 154(b) by 37 days.

(21) Appl. No.: 10/419,194

(22) Filed: Apr. 21, 2003

(65) Prior Publication Data

US 2003/0193391 A1    Oct. 16, 2003

Related U.S. Application Data

(63) Continuation of application No. 09/943,206, filed on Aug. 31, 2001, now abandoned.

(30) Foreign Application Priority Data

Sep. 5, 2000    (JP)    ............................. 2000-269050

(51) Int. Cl.
*B60C 23/00*    (2006.01)
(52) U.S. Cl. .................. 340/444; 340/442; 73/146; 73/146.2; 702/148
(58) Field of Classification Search ................ 340/444, 340/442, 438; 303/140, 146, 163, 173; 73/146, 73/146.2, 146.3, 146.5; 200/61.72, 61.25; 702/148; 701/70, 71; 180/148
See application file for complete search history.

(56) References Cited

U.S. PATENT DOCUMENTS

| | | | |
|---|---|---|---|
| 5,591,906 A | | 1/1997 | Okawa et al. |
| 5,900,543 A | | 5/1999 | Oshiro |
| 5,923,244 A | * | 7/1999 | Jones .......................... 340/442 |
| 5,939,626 A | * | 8/1999 | Tominaga et al. ......... 73/146.2 |
| 6,109,099 A | * | 8/2000 | Kawai et al. ............... 73/146.5 |
| 6,323,765 B1 | * | 11/2001 | Horie et al. ................. 340/442 |
| 6,339,957 B1 | * | 1/2002 | Yanase et al. ................ 73/146 |
| 6,408,690 B1 | * | 6/2002 | Young et al. ............... 73/146.5 |
| 6,450,020 B1 | * | 9/2002 | Naito et al. ................. 73/146.2 |

FOREIGN PATENT DOCUMENTS

| | | |
|---|---|---|
| EP | 0826525 A2 | 3/1998 |
| EP | 0826526 A2 | 3/1998 |
| EP | 0997326 A2 | 5/2000 |
| JP | 08-244575 | 9/1996 |
| WO | WO 00/59743 | 10/2000 |

* cited by examiner

Primary Examiner—Davetta W. Goins
(74) Attorney, Agent, or Firm—Birch, Stewart, Kolasch & Birch, LLP

(57) ABSTRACT

An apparatus for alarming a decrease in tire air-pressure which alarms the decrease in inner pressure of the tire by using a judged value calculated based on wheel speed information obtained from tires fitted to a four-wheeled vehicle. The apparatus comprises calculating means for calculating the judged value based on the wheel speed information on each of the tires, the calculating means being connected to one of on-vehicle LANs, via which the wheel speed information on each of the tires is transmitted. The calculates means captures the wheel speed information on each of the tires via one of the on-vehicle LANs. The wheel speed information is converted into the digital data, which is then captured into the apparatus for alarming the decrease in tire air-pressure via the on-vehicle LAN, thus remarkably reducing the number of lines laid in the vehicle in comparison with the prior art.

15 Claims, 6 Drawing Sheets

APPARATUS AND METHOD FOR
ALARMING DECREASE IN TIRE
AIR-PRESSURE

This application is a continuation of Application No. 09/943,206, filed on Aug. 31, 2001, now abandoned, the entire contents of which are hereby incorporated by reference and for which priority is claimed under 35 U.S.C. § 120; and this application claims priority of Application No. 2000-269050 filed in Japan on Sep. 5, 2000 under 35 U.S.C. § 119.

BACKGROUND OF THE INVENTION

The present invention relates to an apparatus and a method for alarming a decrease in tire air-pressure and, more particularly, to an apparatus and a method for alarming a decrease in tire air-pressure, in which an installation space can be saved and the cost of manufacturing can be reduced.

As a safety device for a four-wheeled vehicle such as a passenger car, there has been conventionally known an apparatus for alarming a decrease in tire air-pressure of a system for detecting a change in tire air-pressure based on variations in wheel speed information. Such an apparatus is configured such that a sine-wave analog signal output from a wheel speed sensor provided in each of four wheels is taken out via a special signal line, to be then captured as a pulse of a wheel speed signal through a binarization circuit, as illustrated in FIG. 5, or that a signal is directly captured from another calculator having a wheel speed signal captured therein, for example, an ABS calculator via a memory, and an alarm is issued upon detection of a decrease in tire air-pressure, as illustrated in FIG. 6.

However, the alarming apparatus, in which the signal line is used exclusively for each of the wheel speed signals, needs four pieces (or sets) of signal lines, and therefore, has been not acceptable in the current circumstance in which the cost is to be cut down by reducing the number of lines as possible.

Furthermore, the above-described alarming apparatus, in which the wheel speed signal is captured from the other calculator via the memory, need to use both of the calculator and the memory. Consequently, the alarming apparatus must be mounted on a substrate on which the calculator capturing the wheel speed signal is mounted, thereby arising a problem of severe limitation of the freedom of design for mounting the alarming apparatus and the calculator.

In the meantime, there has been known an apparatus for detecting a decrease in tire air-pressure wherein a detection signal output from the wheel speed sensor is once captured into an ABS microcomputer as the wheel speed signal binarized in the binarization circuit, and then, captured information on the number of wheel speed pulses (i.e., data on the number of pulses and a measurement time) is received via a communication line (Japanese Unexamined Patent Publication No. 71818/1998). The above-described detecting apparatus is simplified in configuration and reduced in cost by omitting an input interface circuit, which has been conventionally provided in a microcomputer for detecting a decrease in tire air-pressure.

However, the communication line in the above-described detecting apparatus connects the ABS microcomputer to the microcomputer for an apparatus for alarming a decrease in tire air-pressure in a one-to-one correspondence, and therefore, the communication line is increased in length in the case where the two microcomputers are positioned apart from each other, thereby arising problems of easy occurrence of a communication error in addition to an increase in cost, resulting in the low freedom of the layout of the microcomputer.

In view of the above-described circumstances, an object of the present invention is to provide an apparatus and a method for alarming a decrease in tire air-pressure, in which the cost of manufacturing can be reduced by using an on-vehicle communication network (hereinafter referred to as an on-vehicle LAN).

SUMMARY OF THE INVENTION

In accordance with the present invention, there is provided an apparatus for alarming a decrease in tire air-pressure which alarms the decrease in inner pressure of the tire by using a judged value calculated based on wheel speed information obtained from tires fitted to a four-wheeled vehicle, comprising calculating means for calculating the judged value based on the wheel speed information on each of the tires, the calculating means being connected to one of on-vehicle LANs, via which the wheel speed information on each of the tires is transmitted wherein the calculates means captures the wheel speed information on each of the tires via one of the on-vehicle LANs.

In accordance with the present invention, there is also provided a method for alarming a decrease in tire air-pressure which alarms the decrease in inner pressure of the tire by using a judged value calculated based on wheel speed information obtained from tires fitted to a four-wheeled vehicle, comprising the step of capturing the wheel speed information on each of the tires into calculating means for calculating the judged value based on the wheel speed information on each of the tires via one of on-vehicle LANs.

DETAILED DESCRIPTION

Embodiment 1

An apparatus and a method for alarming a decrease in tire air-pressure according to the present invention will be described below with reference to the accompanying drawings.

Figure 1:
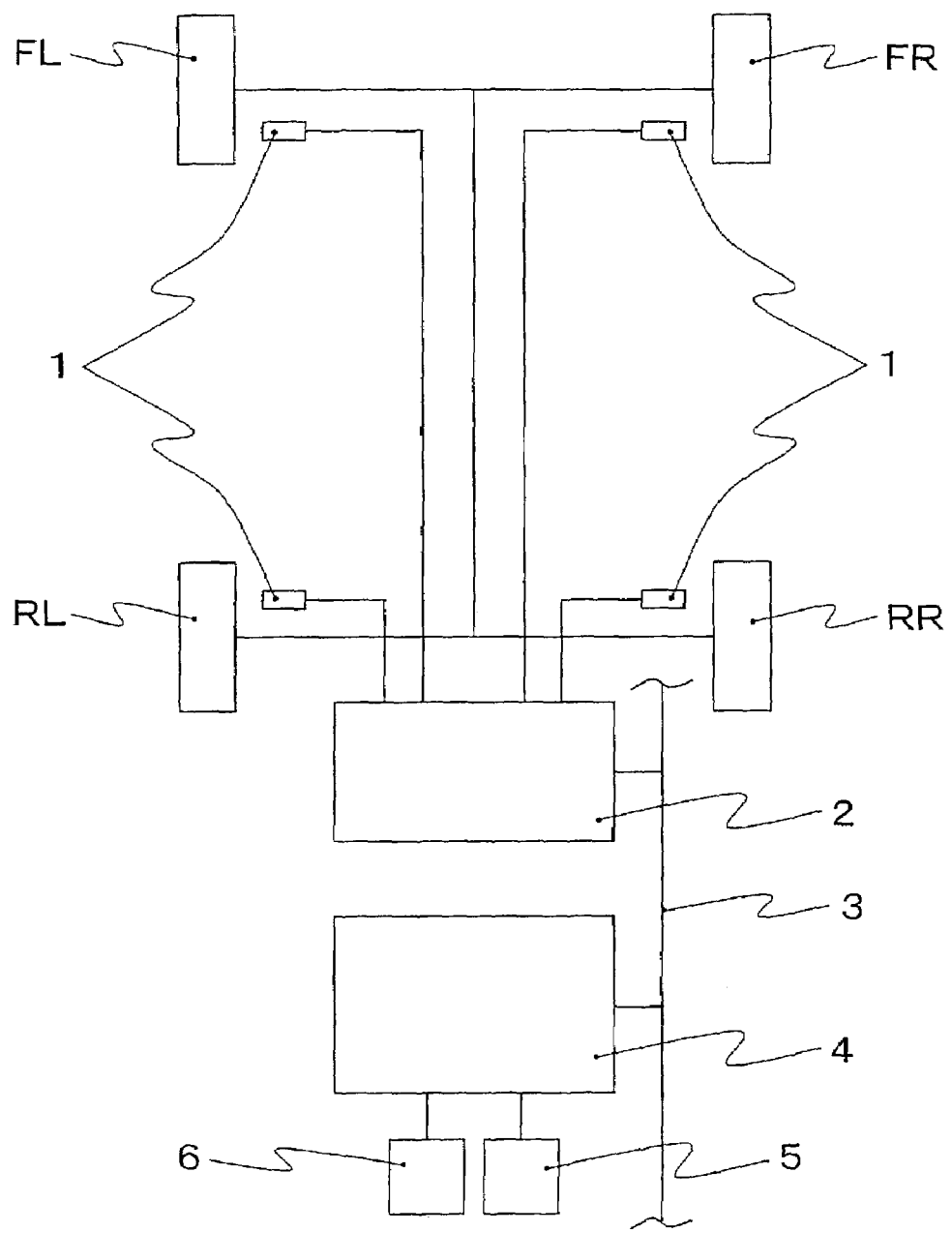
FIG. 1 is a block diagram illustrating an embodiment of an apparatus for alarming a decrease in tire air-pressure according to the present invention.
Figure 2:
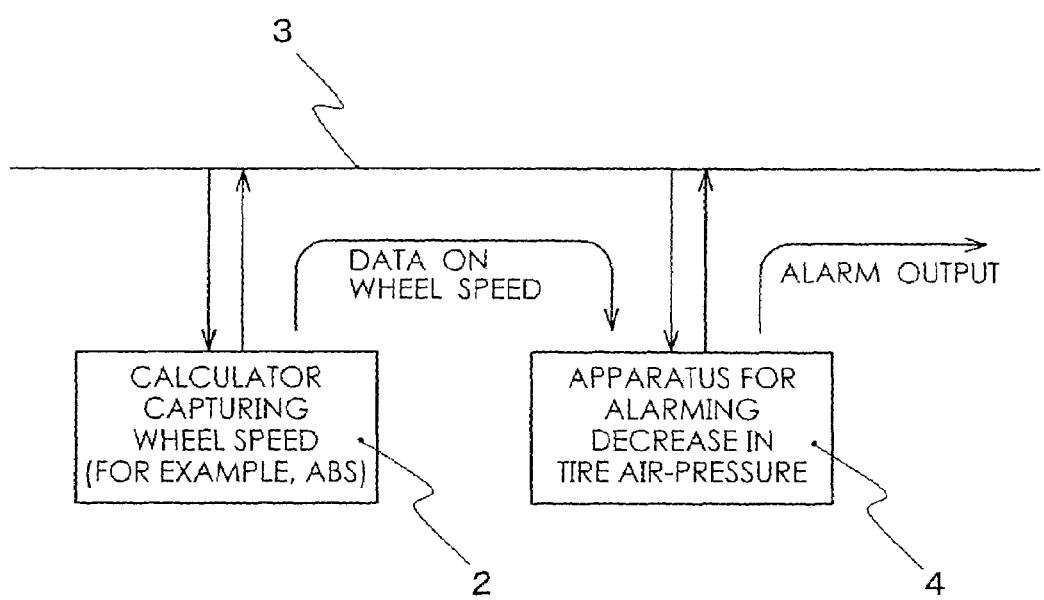
FIG. 2 illustrates the state, in which wheel speed information is captured in a first embodiment according to the present invention.
Figure 3:
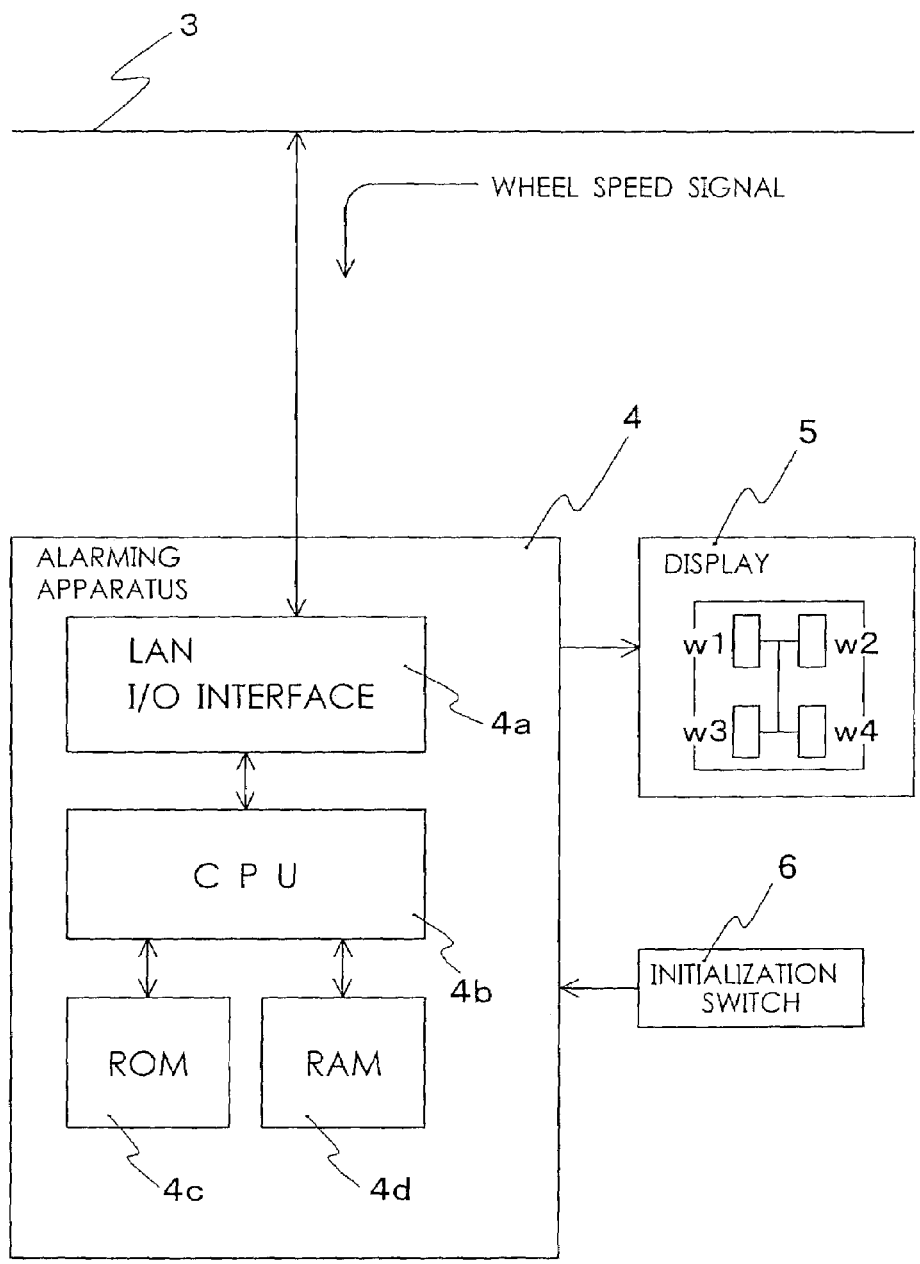
FIG. 3 is a block diagram illustrating the electric configuration of the apparatus for alarming a decrease in tire air-pressure of FIG. 1.

As shown in FIGS. 1 to 3, an apparatus for alarming decrease in tire air-pressure according to Embodiment 1 of the present invention is so designed as to detect whether or not pneumatic pressures of four tires FL, FR, RL and RR ($W_i$, i=1~4, 1: front left tire, 2: front right tire, 3: rear left tire, 4: rear right tire) attached to, for example, a four-wheeled vehicle are decreased, and is provided with popular wheel speed information detecting means 1 respectively provided in connection with each tire $W_i$.

The wheel speed information detecting means 1 takes the form of, for example, a wheel speed sensor for measuring a wheel speed from the number of rotation pulses generated by using an electromagnetic pickup or the like, or an angular velocity sensor for measuring a wheel speed from a voltage generated by using rotation by an electric dynamo.

An apparatus for alarming a decrease in tire air-pressure, which is mounted on a vehicle, in the present embodiment is not specially limited as long as the apparatus is adapted to alarm a decrease in inner pressure of a tire by using a judged value calculated based on wheel speed information obtained from tires fitted to a four-wheeled vehicle. The apparatus comprises, for example, wheel speed information detecting means for detecting wheel speed information on each of the tires, memory means for storing therein the wheel speed information on each of the tires, and calculating means for calculating a judged value based on the wheel speed information on each of the tires.

In the present embodiment, the wheel speed information (a wheel speed signal) detected by wheel speed information detecting means 1 disposed in each of the tires is captured into a calculator 2 for an ABS or the like, and then, the wheel speed signal is converted into digital data, so that data on the wheel speed information (i.e., wheel speed data) is transmitted to an apparatus 4 for alarming a decrease in tire air-pressure via an on-vehicle LAN 3, and finally, is captured into the above-described calculating means.

A rotational angular velocity of each of the tires is obtained based on the data on the wheel speed information. The sum of the rotational angular velocities of a diagonal pair of tires is subtracted from the sum of the rotational angular velocities of another diagonal pair of tires. In the case where a ratio (a judged value) of the subtraction result to an average value of the two sums exceeds a predetermined threshold value, a decrease in tire air-pressure is judged, so that an alarm is issued.

To the apparatus 4 for alarming the decrease in tire air-pressure are connected a display 5 consisting of a liquid crystal display element, a plasma display element or a CRT for teaching a tire $W_i$ having a decreased air pressure and an initialization switch 6 which can be operated by a driver.

To the above-described on-vehicle LAN 3 are connected the ABS calculator, the apparatus for alarming the decrease in tire air-pressure and other calculators, for transmitting or receiving various data in addition to the wheel speed data. A signal of the initialization switch or an alarm output for the display might be transmitted or received with the use of the on-vehicle LAN 3.

As illustrated in FIG. 3, in the alarming apparatus 4, the calculating means and the memory means are included in a calculator consisting of an I/O interface 4a required for transmitting or receiving a signal to or from the on-vehicle LAN 3, a CPU 4b which functions as a center of calculation, a ROM 4c storing therein a control program for the CPU 4b, and a RAM 4d, in or from which data is temporarily written or the written data is read when the CPU 4b performs a control operation.

In the present embodiment, the wheel speed signal is converted into digital data, which is then captured via the on-vehicle LAN, thereby remarkably reducing the number of the conventional signal lines. Consequently, the cost of manufacturing can be reduced. Moreover, the apparatus for alarming the decrease in tire air-pressure can be disposed wherever the on-vehicle LAN is laid, thus increasing the freedom of design.

Embodiment 2

Next, a description will be given of another embodiment. The wheel speed is very slightly varied according to the decrease in tire air-pressure. For example, the wheel speed is varied by about 0.2% with respect to a decrease in pressure of 30%.

It is, accordingly, necessary to capture wheel speed information with high accuracy in order to detect the decrease in tire air-pressure in a short time with high accuracy. In view of this, 2 bytes (16 bits) are required as data on the wheel speed information per wheel, as illustrated below in Table 1.

TABLE 1

| WHEEL SPEED INFORMATION OF WHEEL 1 (2 BYTES) | WHEEL SPEED INFORMATION OF WHEEL 2 (2 BYTES) | WHEEL SPEED INFORMATION OF WHEEL 3 (2 BYTES) | WHEEL SPEED INFORMATION OF WHEEL 4 (2 BYTES) |
| --- | --- | --- | --- |

Four times the data of 2 bytes per wheel, i.e., 8 bytes in total, are captured via one transmission, so that the data on the wheel speed information can be accurately captured with high efficiency.

Embodiment 3

As described by way of the above Embodiment 2, the wheel speed information can be captured in 2 bytes in the case where the receivable data on the wheel speed information has been already calculated with sufficient accuracy. However, in the case where a wheel speed cannot be calculated since a high load is imposed on a microcomputer for calculating wheel speed information, data on the wheel speed information cannot be calculated, and therefore, the wheel speed information cannot be captured in 2 bytes.

Figure 4:
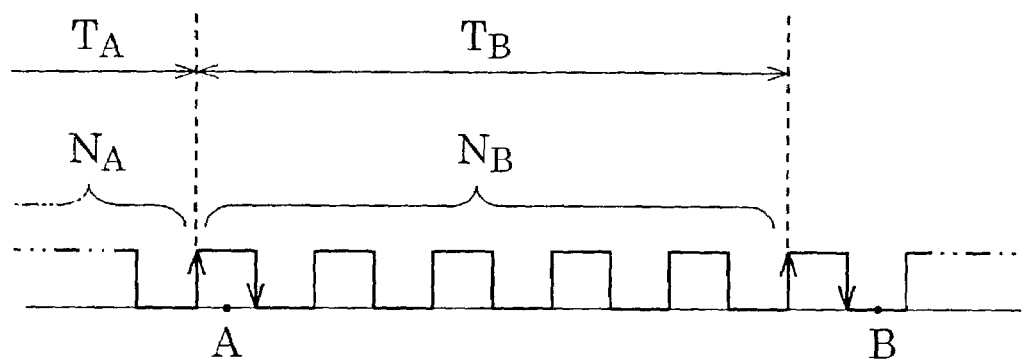
FIG. 4 illustrates the state in which wheel speed information is captured in a third embodiment according to the present invention.
Figure 5:
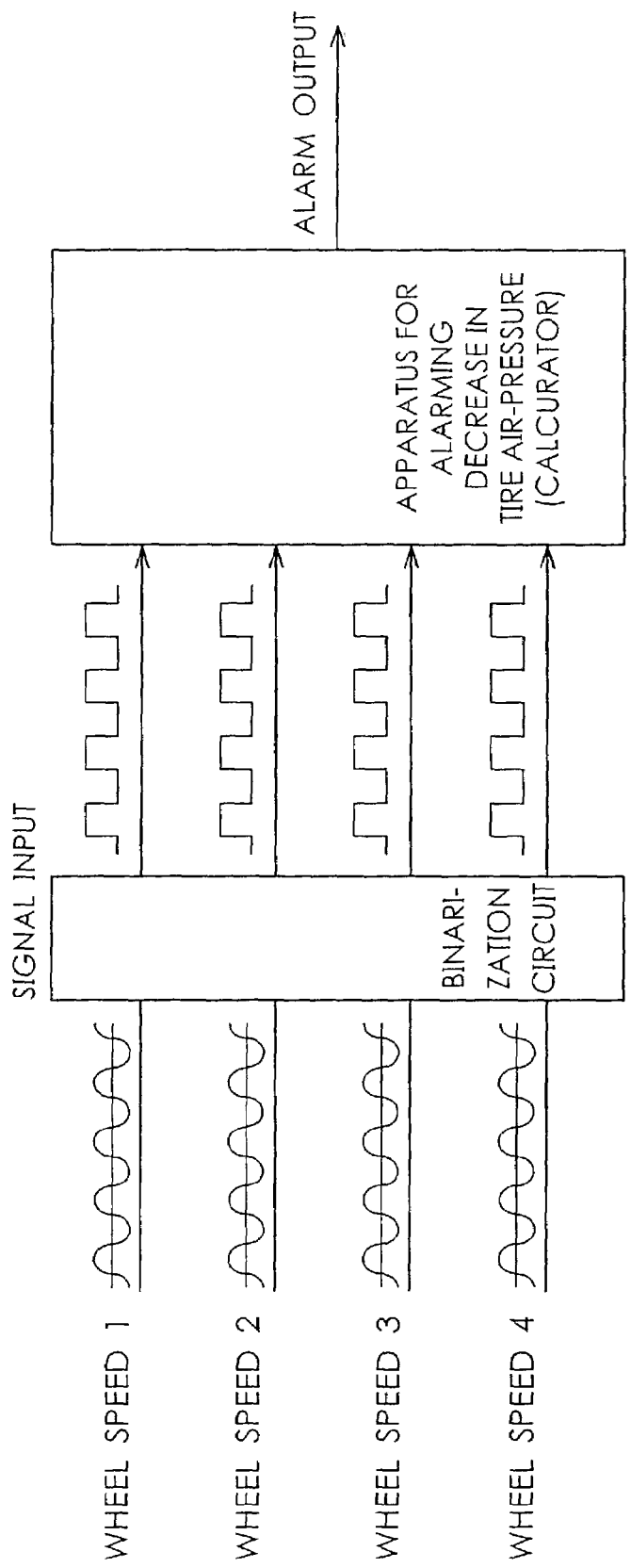
FIG. 5 illustrates the state in which wheel speed information is captured in the prior art.
Figure 6:
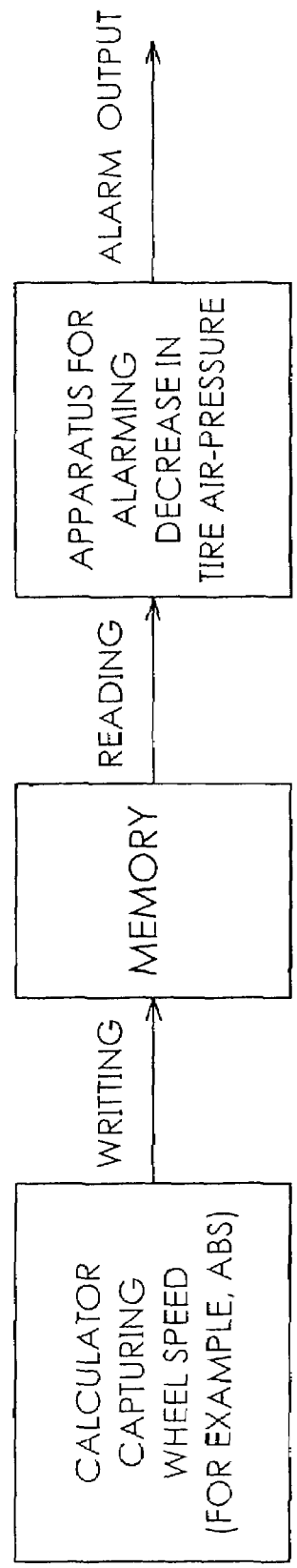
FIG. 6 illustrates another state in which wheel speed information is captured in the prior art.

In this case, there is used wheel speed information that is expressed by the combination of the number of pulses output in proportion to the rotation of a wheel (wheel speed pulses) and a time corresponding to the number of pulses. For example, transmission or reception can be performed in the form of data on the wheel speed information illustrated in FIG. 4. In FIG. 4, each of points A and B indicates a timing when the data on the wheel speed information is received. An interval of data received at the timing B is equivalent to a period of time $T_B$ from the rising-up of a pulse immediately before the point A till the rising-up of a pulse immediately before the point B. The number of wheel speed pulses during that period is indicated by $N_B$. In a similar manner, an interval of data received at the timing A is equivalent to a period of time $T_A$, in which the number of wheel speed pulses is indicated by $N_A$. Here, each of the numbers $N_A$ and $N_B$ of wheel speed pulses is 1-byte data, and each of the corresponding times $T_A$ and $T_B$ is 2-bytes data.

It is preferable that the interval for capturing the data on the wheel speed information ranges from 10 ms to 100 ms. This is because it is preferable that the data is captured at an interval within this range in order to prevent any erroneous notice on an easy-to-slip road.

Incidentally, although the description has been given by way of the interval from the rising-up of one pulse to the rising-up of the other pulse in the present embodiment, the data might be captured at an interval from the rising-down of one pulse to the rising-down of the other pulse.

As described above, according to the present invention, the wheel speed information is converted into the digital data, which is then captured into the apparatus for alarming the decrease in tire air-pressure via the on-vehicle LAN, thus remarkably reducing the number of lines laid in the vehicle in comparison with the prior art. Furthermore, the apparatus for alarming the decrease in tire air-pressure can be mounted wherever it can be connected to the on-vehicle LAN, thus enhancing the freedom of design of an electrical system inside the vehicle to allow the apparatus be mounted in a relatively great space.

What is claimed is:

1. An apparatus for alarming a decrease in tire air-pressure which alarms the decrease in inner pressure of the tire by using a judged value calculated based on wheel speed information obtained from tires fitted to a four-wheeled vehicle, comprising calculating means for calculating the judged value based on the wheel speed information on each of the tires, the calculating means being connected to one of on-vehicle LANs, via which the wheel speed information on each of the tires is transmitted, wherein the calculating means converts the wheel speed information into digital data and the calculating means captures the wheel speed information on each of the tires via one of the on-vehicle LANs, wherein at least a means for calculating wheel speed and the apparatus for alarming a decrease in the tire air-pressure are connected to said one of on-vehicle LANS, and said wheel speed information per wheel is 2 bytes of digital data per each wheel by using said means for calculating wheel speed, said digital data being transmitted to said apparatus for alarming a decrease in tire air-pressure via said one of on-vehicle LANs, and said wheel speed information of four wheels is captured via one transmission.

2. The apparatus of claim 1, wherein an interval for capturing the data on the wheel speed information ranges from 10 ms to 100 ms.

3. A method for alarming a decrease in tire air-pressure which alarms the decrease in inner pressure of the tire by using a judged value calculated based on wheel speed information obtained from tires fitted to a four-wheeled vehicle, comprising the steps of:

converting the wheel speed information into 2 bytes of digital data per wheel and transmitting said digital data; and receiving said transmitted digital data and calculating the judged value based on said wheel speed information of each of the tires, wherein said digital data of wheel speed information for four wheel are captured via one transmission.

4. The method of claim 5, wherein an interval for capturing the data on the wheel speed information ranges from 10 ms to 100 ms.

5. The apparatus of claim 1, wherein the calculating means comprises an I/O interface for transmitting or receiving a signal to or from the on-vehicle LANs, a CPU to perform calculations, a ROM for storing a control program for the CPU, and a RAM for temporarily writing data.

6. The method of claim 3, wherein the calculating is performed using a calculating means which comprises an I/O interface for transmitting or receiving a signal to or from the on-vehicle LANs, a CPU to perform calculations, a ROM for storing a control program for the CPU, and a RAM for temporarily writing data.

7. The apparatus of claim 1, wherein the calculating means is connected to a display for displaying an alarm for decrease in tire air pressure.

8. The method of claim 6, wherein the calculating means is connected to a display for displaying an alarm for decrease in tire air pressure.

9. The apparatus of claim 7, wherein the display comprises a liquid crystal display element, a plasma display element or a CRT.

10. The method of claim 8, wherein the display comprises a liquid crystal display element, a plasma display element or a CRT.

11. An apparatus for alarming a decrease in tire air-pressure which alarms the decrease in inner pressure of the tire by using a judged value calculated based on wheel speed information obtained from tires fitted to a four-wheeled vehicle, comprising a calculator for calculating the judged value based on the wheel speed information on each of the tires, the calculator being connected to one of on-vehicle LANs, via which the wheel speed information on each of the tires is transmitted, wherein the calculator converts the wheel speed information into digital data and the calculator captures the wheel speed information on each of the tires via one of the on-vehicle LANs.

12. An apparatus for alarming a decrease in tire air-pressure which alarms the decrease in inner pressure of the tire by using a judged value calculated based on wheel speed information obtained from tires fitted to a four-wheeled vehicle, comprising calculating means for calculating the judged value based on the wheel speed information on each of the tires, the calculating means being connected to one of on-vehicle LANs, via which the wheel speed information on each of the tires is transmitted, wherein the calculating means converts the wheel speed information into digital data and the calculating means captures the wheel speed information on each of the tires via one of the on-vehicle LANs, wherein the wheel speed information per wheel is 2 bytes, and wheel speed information for four wheels is captured via one transmission.

13. An apparatus for alarming a decrease in tire air-pressure which alarms the decrease in inner pressure of the tire by using a judged value calculated based on wheel speed information obtained from tires fitted to a four-wheeled vehicle, comprising calculating means for calculating the judged value based on the wheel speed information on each of the tires, the calculating means being connected to one of on-vehicle LANs, via which the wheel speed information on each of the tires is transmitted, wherein the calculating means converts the wheel speed information into digital data and the calculating means captures the wheel speed information on each of the tires via one of the on-vehicle LANs, wherein the wheel speed information is one expressed by a combination of the number of pulses output in proportion to rotation of a wheel and a time corresponding to the number of pulses, and the number of pulses and the corresponding time are received in 1 byte and 2 bytes respectively.

14. A method for alarming a decrease in tire air-pressure which alarms the decrease in inner pressure of the tire by using a judged value calculated based on wheel speed information obtained from tires fitted to a four-wheeled vehicle, comprising the step of capturing the wheel speed information on each of the tires into calculating means for calculating the judged value based on the wheel speed information on each of the tires via one of on-vehicle LANs, wherein the calculating means converts the wheel speed information into digital data, wherein the wheel speed information per wheel is 2 bytes, and wheel speed information for four wheels is captured via one transmission.

15. A method for alarming a decrease in tire air-pressure which alarms the decrease in inner pressure of the tire by using a judged value calculated based on wheel speed information obtained from tires fitted to a four-wheeled vehicle, comprising the step of capturing the wheel speed information on each of the tires into calculating means for calculating the judged value based on the wheel speed information on each of the tires via one of on-vehicle LANs, wherein the calculating means converts the wheel speed information into digital data, wherein the wheel speed information is one expressed by a combination of the number of pulses output in proportion to rotation of a wheel and a time corresponding to the number of pulses, and the number of pulses and the corresponding time are received in 1 byte and 2 bytes respectively.

* * * * *